United States Patent
Laselva et al.

(10) Patent No.: US 9,980,152 B2
(45) Date of Patent: May 22, 2018

(54) METHOD OF INDICATION OF AVAILABLE RADIO RESOURCES

(71) Applicant: Nokia Technologies Oy, Espoo (FI)

(72) Inventors: Daniela Laselva, Klarup (DK); Jeroen Wigard, Klarup (DK); Dario Tonesi, Wroclaw (PL)

(73) Assignee: NOKIA TECHNOLOGIES OY, Espoo (FI)

( * ) Notice: Subject to any disclaimer, the term of this patent is extended or adjusted under 35 U.S.C. 154(b) by 0 days. days.

(21) Appl. No.: 15/398,285

(22) Filed: Jan. 4, 2017

(65) Prior Publication Data

US 2017/0201890 A1    Jul. 13, 2017

Related U.S. Application Data

(60) Provisional application No. 62/276,014, filed on Jan. 7, 2016.

(51) Int. Cl.
| | | |
|---|---|---|
| *H04W 72/00* | (2009.01) | |
| *H04W 16/14* | (2009.01) | |
| *H04W 28/16* | (2009.01) | |
| *H04W 72/04* | (2009.01) | |
| *H04W 28/08* | (2009.01) | |
| *H04W 48/00* | (2009.01) | |
| *H04W 76/02* | (2009.01) | |
| *H04W 92/20* | (2009.01) | |

(52) U.S. Cl.
CPC ......... *H04W 16/14* (2013.01); *H04W 28/08* (2013.01); *H04W 28/16* (2013.01); *H04W 48/00* (2013.01); *H04W 72/04* (2013.01); *H04W 76/025* (2013.01); *H04W 76/15* (2018.02); *H04W 92/20* (2013.01)

(58) Field of Classification Search
CPC ..... H04W 16/14; H04W 8/245; H04W 88/06; H04W 28/0263; H04W 72/04; H04W 28/16; H04M 1/72519
USPC ............ 455/454, 552.1, 418, 550.1; 370/230
See application file for complete search history.

(56) References Cited

U.S. PATENT DOCUMENTS

| | | | | |
|---|---|---|---|---|
| 9,167,494 | B2 * | 10/2015 | De Pasquale | ......... H04W 36/24 |
| 2011/0011567 | A1 * | 1/2011 | Aybay | ................ H05K 7/20563 165/121 |
| 2011/0066673 | A1 * | 3/2011 | Outlaw | ............... H04L 65/4092 709/203 |
| 2013/0188646 | A1 * | 7/2013 | Lu | ....................... H04L 41/5019 370/392 |
| 2013/0322395 | A1 * | 12/2013 | Kazmi | ................ H04W 72/082 370/329 |

(Continued)

*Primary Examiner* — Danh Le
(74) *Attorney, Agent, or Firm* — Squire Patton Boggs (US) LLP

(57) ABSTRACT

Various communication systems may benefit from communication between two different radio access technologies. For example, a long term evolution network may benefit from receiving resource availability information from a wireless local area network. A method includes receiving a request from a first RAT at a network node in a second RAT, and at least partially rejecting or at least partially accepting the request. The method also includes sending an indication of the at least partial rejection or at least partial acceptance to the first radio access technology, where the indication is used in determining whether to activate or continue radio access aggregation.

20 Claims, 4 Drawing Sheets

(56) References Cited

U.S. PATENT DOCUMENTS

| | | | |
|---|---|---|---|
| 2013/0336281 A1* | 12/2013 | Ahn | H04W 72/082 370/330 |
| 2014/0237080 A1* | 8/2014 | Stanwood | H04W 40/22 709/218 |
| 2014/0355429 A1* | 12/2014 | Smith | H04W 28/0226 370/230 |
| 2014/0355430 A1* | 12/2014 | Smith | H04W 28/0263 370/230 |
| 2014/0355443 A1* | 12/2014 | Smith | H04W 28/0289 370/235 |
| 2014/0355463 A1* | 12/2014 | Smith | H04M 15/60 370/252 |
| 2014/0355570 A1* | 12/2014 | Smith | H04W 36/0072 370/332 |
| 2016/0197781 A1* | 7/2016 | Smith | H04L 41/0806 370/254 |
| 2016/0255671 A1* | 9/2016 | Rahman | H04W 76/025 370/329 |
| 2017/0078890 A1* | 3/2017 | Zhu | H04W 16/14 |
| 2017/0188407 A1* | 6/2017 | Zee | H04W 76/026 |

* cited by examiner

METHOD OF INDICATION OF AVAILABLE RADIO RESOURCES

CROSS REFERENCE TO RELATED APPLICATION

This application claims priority to U.S. Provisional Application No. 62/276,014 filed on Jan. 7, 2016. The entire content of the above-referenced provisional application is hereby incorporated by reference.

BACKGROUND

Field

Various communication systems may benefit from communication between two different radio access technologies. For example, a long term evolution network may benefit from receiving resource availability information from a wireless local area network.

Description of the Related Art

Due to the diverse nature of modern communication systems, it is increasingly important for different radio access technologies to be able to effectively interact with each another. A single user equipment, for example, may interact with multiple radio access networks simultaneously. The different radio access technologies may be used in conjunction to help accommodate for the data demands of the user equipment.

In long term evolution (LTE), for example, data used by a user equipment may be split between the LTE network and a wireless local area network (WLAN). In this example, the bearer between the LTE network and WLAN is split to accommodate for the data used by the user equipment. To facilitate this splitting of data between LTE network and WLAN, a standardized interface Xw between the LTE and WLAN may be established. A network node, using third generation partnership project (3GPP) technology, may be created to help facilitate this Xw interface. For example, the network node may be a WLAN Termination (WT) located in the WLAN, and can be used to terminate the Xw interface at the WLAN side. Xw can then be used to control the communications between LTE network and WLAN, such as user plane forwarding, flow control feedback signaling, and control plane signaling.

One application of different radio access technologies interacting with one another is in the form of resource aggregation. By combining the resources of two different radio access technologies, a communications system will be able to more effectively serve the data demands of user equipment. One example can be aggregation between an LTE network and a WLAN (LWA). In this example, a user equipment may be connected to both LTE and WLAN and use both technologies simultaneously in the same bearer to send and receive data. This aggregation can be used to lessen the burden of individual radio access technologies in accommodating for the data demands of a user equipment.

Before activating aggregation procedures between different radio access technologies, a network node should initiate a user plane tunnel over an interface between the different radio access technologies. For example, establishing of LWA can begin with an LTE network node initiating the establishment of the user plane tunnel for a specific radio bearer over Xw with the WT. There are, however, various signaling and resource costs associated with establishment of a user plane tunnel.

SUMMARY

A method, in certain embodiments, may include receiving a request from a first radio access technology at a network node in a second radio access technology. The method may also include at least partially rejecting or at least partially accepting the request from the first radio access technology. In addition, the method may include sending an indication of the at least partial acceptance or the at least partial rejection of the second radio access technology.

According to certain embodiments, an apparatus may include at least one memory including computer program code, and at least one processor. The at least one memory and the computer program code may be configured, with the at least one processor, to receive a request from a first radio access technology at a network node in a second radio access technology. The at least one memory and the computer program code may also be configured, with the at least one processor, at least to at least partially rejecting or at least partially accepting the request from the first radio access technology. In addition, the at least one memory and the computer program code may also be configured, with the at least one processor, at least to sending an indication of the at least partial acceptance or the at least partial rejection. The indication is used in determining whether to activate or continue radio access aggregation.

An apparatus, in certain embodiments, may include means for receiving a request from a first radio access technology at a network node in a second radio access technology. The apparatus may also include means for at least partially rejecting or at least partially accepting the request from the first radio access technology. In addition, the apparatus may means for sending an indication of the at least partial acceptance or the at least partial rejection. The indication is used in determining whether to activate or continue radio access aggregation.

According to certain embodiments, a non-transitory computer-readable medium encoding instructions that, when executed in hardware, perform a process. The process may include receiving a request from a first radio access technology at a network node in a second radio access technology. The process may also include at least partially rejecting or at least partially accepting the request from the first radio access technology. In addition, the process may include sending an indication the at least partial acceptance or the at least partial rejection.

According to certain embodiments, a computer program product encoding instructions for performing a process according to a method including receiving a request from a first radio access technology at a network node in a second radio access technology. The method may also include at least partially rejecting or at least partially accepting the request from the first radio access technology. In addition, the method includes sending an indication of the at least partial acceptance or the at least partial rejection.

A method, in certain embodiments, may include sending a request from a first access technology to a network node in a second radio access technology. The method can also include receiving an indication that the request is at least partially rejected or at least partially accepted. In addition, the method includes determining whether to activate or continue the radio access aggregation based on the indication.

According to certain embodiments, an apparatus may include at least one memory including computer program code, and at least one processor. The at least one memory and the computer program code may be configured, with the at least one processor, to cause the apparatus at least to send a request from a first access technology to a network node in a second radio access technology. The at least one memory and the computer program code may also be configured, with the at least one processor, to cause the apparatus at least to receive an indication that the request is at least partially rejected or at least partially accepted. In addition, the at least one memory and the computer program code may be configured, with the at least one processor, to cause the apparatus at least to determine whether to activate or continue the radio access aggregation based on the indication An apparatus, in certain embodiments, may include means for sending a request from a first access technology to a network node in a second radio access technology. The apparatus may also include means for receiving an indication that the request is at least partially rejected or at least partially accepted. The apparatus may also include determining whether to activate or continue the radio access aggregation based on the indication.

According to certain embodiments, a non-transitory computer-readable medium encoding instructions that, when executed in hardware, perform a process. The process may include sending a request from a first access technology to a network node in a second radio access technology. The process may also include receiving an indication that the request is at least partially rejected or at least partially accepted. In addition, the process may include determining whether to activate or continue the radio access aggregation based on the indication.

According to certain embodiments, a computer program product encoding instructions for performing a process according to a method including sending a request from a first access technology to a network node in a second radio access technology. The method may also include receiving an indication that the request is at least partially rejected or at least partially accepted. In addition the method may include determining whether to activate or continue the radio access aggregation based on the indication.

A method, in certain embodiments, may include receiving a request from a first node in a radio access technology at a second node in the radio access technology. The method may also include at least partially rejecting or at least partially accepting the request. In addition, the method may include sending an indication of the at least partial rejection or the at least partial acceptance. The indication is used in determining whether to activate or continue radio access aggregation in the radio access technology.

According to certain embodiments, an apparatus may include at least one memory including computer program code, and at least one processor. The at least one memory and the computer program code may be configured, with the at least one processor, to cause the apparatus at least to receive a request from a first node in a radio access technology at a second node in the radio access technology. The at least one memory and the computer program code may also be configured, with the at least one processor, at least to at least partially rejecting or at least partially accepting the request. In addition, the at least one memory and the computer program code may also be configured, with the at least one processor, at least to send an indication of the at least partial rejection or the at least partial acceptance. The indication is used in determining whether to activate or continue radio access aggregation in the radio access technology.

An apparatus, in certain embodiments, may include means for receiving a request from a first node in a radio access technology at a second node in the radio access technology. The apparatus may also include means for at least partially rejecting or at least partially accepting the request. In addition, the apparatus may include means for sending an indication of the at least partial rejection or the at least partial acceptance. The indication is used in determining whether to activate or continue radio access aggregation in the radio access technology.

According to certain embodiments, a non-transitory computer-readable medium encoding instructions that, when executed in hardware, perform a process. The process may include receiving a request from a first node in a radio access technology at a second node in the radio access technology. The process may also include at least partially rejecting or at least partially accepting the request. In addition, the process may include sending an indication of the at least partial rejection or the at least partial acceptance. The indication is used in determining whether to activate or continue radio access aggregation in the radio access technology.

According to certain embodiments, a computer program product encoding instructions for performing a process according to a method including receiving a request from a first node in a radio access technology at a second node in the radio access technology. The method may also include at least partially rejecting or at least partially accepting the request. In addition, the method includes sending an indication of the at least partial rejection or the at least partial acceptance. The indication is used in determining whether to activate or continue radio access aggregation in the radio access technology.

BRIEF DESCRIPTION OF THE DRAWINGS

For proper understanding of the invention, reference should be made to the accompanying drawings, wherein.

DETAILED DESCRIPTION

Figure 1:
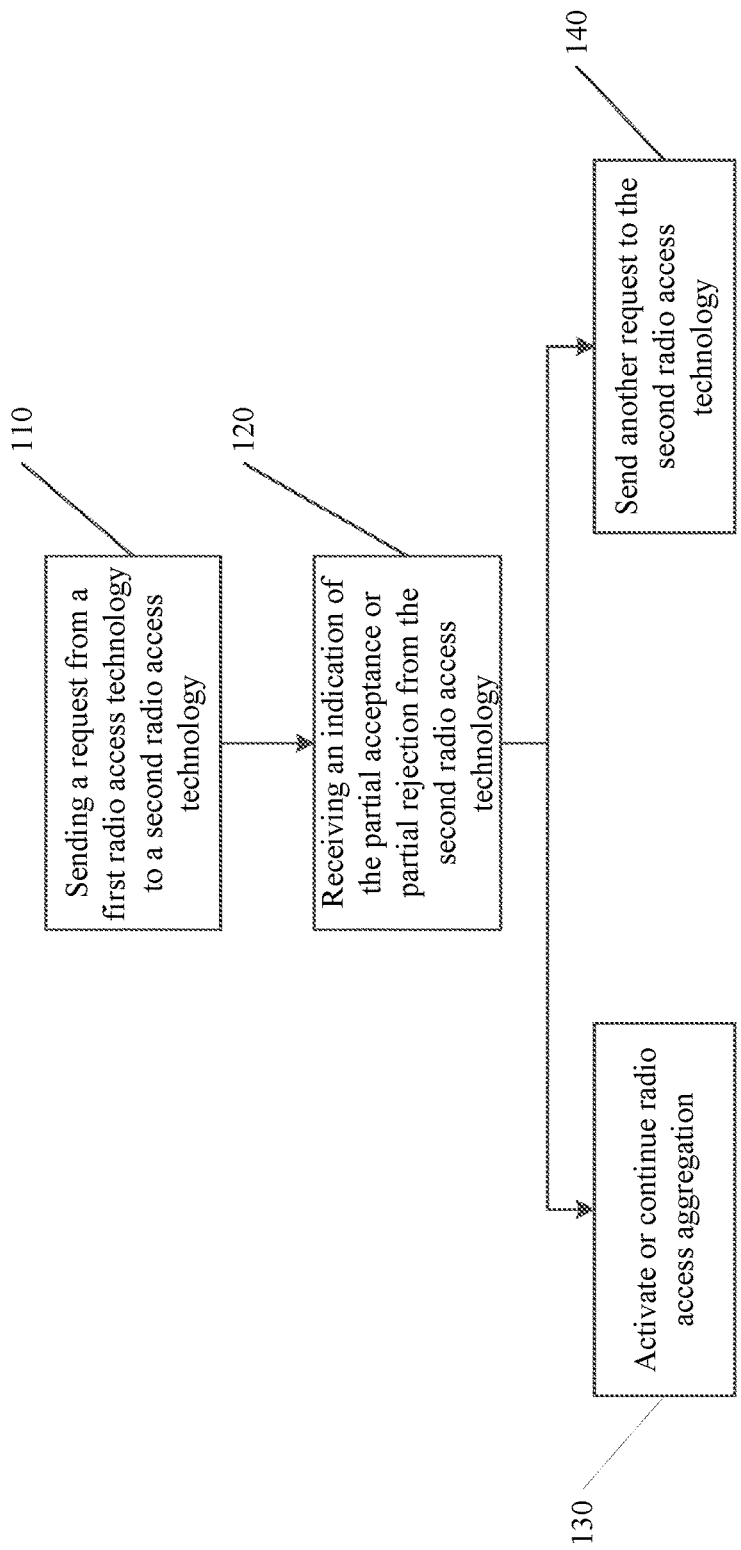
FIG. 1 illustrates a flow diagram according to certain embodiments.

Certain embodiments can allow a network node in a first radio access technology (RAT) to be informed of the resource contribution of a second RAT to a user equipment (UE) throughput. The first RAT can then be aware of the resource availability of the second RAT if the second RAT does not meet the QoS parameters requested by the first RAT. This allows the network node in the first RAT to preserve network resources, by only initiating aggregation when it would be beneficial to do so.

For example, in certain embodiments, where the first RAT may be an LTE network and the second RAT may be WLAN, an E-UTRAN Node (eNB) in an LTE network may know how much resources WLAN can contribute to a UE throughput. The eNB can also know what the resource level that the WLAN can contribute means in terms of added performance. This will allow the eNB to make an informed decision about whether or not to activate or continue LTE-WLAN aggregation. If the WLAN does not have enough available resources to contribute to the UE throughput, the aggregation will not be activated or continued. This can save LTE signaling costs, as well as other resources, associated with establishing LWA. While the embodiments described below refer to LWA, some of the embodiments may also apply to enhanced LWA (eLWA).

In certain embodiments, RAT can include Bluetooth, WLAN, LTE, third generation (3G), fourth generation (4G), or fifth generation (5G) mobile telecommunications technology, or any other radio access technology.

In some embodiments, before aggregation can start, a network node in a first RAT must initiate the establishment of at least a user plane tunnel for specific radio bearers over an interface between the first RAT and the second RAT. In an embodiment in which a first RAT may be an LTE network and the second RAT may be a WLAN, the eNB can initiate the establishment of the user plan tunnels for specific radio bearers over the Xw interface with WT, located in the WLAN.

The second RAT may but does not have to differ from the first RAT. For example, in certain embodiments, a first node and a second node may belong to the same RAT, but the first node and the second node may belong to different vendors. In such a multi-vendor scenario, the first node may want to know about the QoS parameters of the second node. In certain embodiments may use dual connectivity, and the relationship between the nodes may be a master slave relationship. The interface between the nodes may be used to exchange QoS parameters and new bearers.

Radio bearers can be virtual containers having unique quality of service (QoS) characteristics or parameters. In certain embodiments, radio bearers may be Evolved Universal Terrestrial Access Network radio bearers (E-RAB). The bearers may include identification information. For example, the bearer may include an E-RAB ID. This identification information can be sent and received by various network nodes in the first RAT and the second RAT as a mechanism for identifying the wanted bearers.

Bearers can also include QoS parameters. In certain embodiments, the QoS parameters can indicate to the network node in the second RAT the minimum required resources the first RAT would need from the second RAT in order to activate or continue radio resource aggregation. QoS parameters can include at least QoS class identifiers (QCI), guaranteed bit rate (GBR), allocation and retention priority (ARP), packet delay budget, and maximum bit rate (MBR). The QoS parameters may be predetermined according to agreements between the first RAT and second RAT. For example, the QoS parameters may be set according to LTE dual connectivity and LWA agreements. In some embodiments, the QoS parameters may be dictated to the second RAT depending on how much resources the first RAT is requesting to help deal with the data demands of a UE being served by the first RAT.

FIG. 1 illustrates a flow diagram according to certain embodiments. In step 110, a network node can send a request from a first RAT to a second RAT. The type of network node may depend on the type of RAT being used. The request may be for the second RAT to allocate resources for specific radio bearers. In one embodiment, the request by the network node initiates the establishment of user plane tunnels for specific radio bearer over an interface between a first RAT and a second RAT.

For example, the first RAT may be an LTE network and the second RAT may be a WLAN, while the network node in the LTE side may be an eNB, and the network node on the WLAN side may be a WT. In some embodiments, the eNB can initiate the establishment of tunnels for specific E-RABs over the Xw with the WT in the WLAN. The request may include the E-RAB ID, and some E-RAB level QoS parameters. In certain embodiments, the request to the WT may be to allocate WLAN resources for specific E-RABs, indicating E-RABs characteristics. In some embodiments, the request may be similar to the request for Dual Connectivity (DC) in a split bearer option in LTE.

In some embodiments the request may include an indication of whether or not the network node in the first RAT is willing to accept a partial acceptance by the network node in the second RAT of the QoS parameters requested for each bearer. For example, for each E-RAB ID in the E-RABs to be Added List there may be a partial acceptance flag.

In certain embodiments, this request is used to gage the resource availability of the second RAT. This resource availability can then be considered by the first RAT before activating radio resource aggregation.

Once the request is received by the network node in the second RAT, the network node can then choose whether to accept or reject the establishment based on implementation specific admission control procedures. While the request might indicate to the network node in the second RAT the QoS parameters that the first RAT is requesting, the second network node may autonomously choose whether or not to abide by the request.

In step 120, when the request is either rejected in-part or accepted in-part, the network node in the first RAT receives an indication from the network node in the second RAT of how much the second RAT can contribute to the UE throughput. In some embodiments, therefore, the network node in the first RAT can know how much the second RAT can contribute to the UE throughput before activating radio resource aggregation with the second RAT.

In some other embodiments, when the request is accepted the network node in the first RAT may receive an indication from the network node in the second RAT of the available resources of the network node in the second RAT. The network node in the first RAT will therefore receive from the network node in the second RAT an indication of available resources, even when the availability is greater than or equal to the requested resources. In certain embodiments, for example, this indication of available resources even after activation of resource aggregation may help to guide the data split at the network node in the first RAT when flow control feedback is not yet available.

In certain embodiments, the network node in the first RAT receives an indication of the available bit rate in the second RAT. For example, the second RAT may be a WLAN, and an indication from the WLAN can includes an indication of the bit rate which WLAN can provide in the next time period to a bearer. The LWA bearer can split resources between the LTE network and the WLAN, and can belong to a certain QoS class or queue. The indication may be estimated by the network node in the second RAT and provided to the first RAT at the time when the first RAT requests the network node in the second RAT to establish a tunnel for a new E-RAB.

In step 130, the request sent by the network node in the first RAT is accepted by the network node in the second RAT, and radio access aggregation can be activated. For example, LWA aggregation between the LTE and the WLAN can be activated. In other embodiments, when aggregation is already occurring between the first RAT and the second RAT, radio access aggregation may be continued. During aggregation, the data needs of a UE may be split between LTE network and WLAN. As such, both the LTE network and WLAN can contribute resources to the UE simultaneously, lessening the individual resource burden on the LTE network and the WLAN.

In other embodiments, when the request is rejected in-part, the network node in the first RAT may choose to re-attempt or not re-attempt to establish the tunnel with the second RAT. As shown in step 140, the network node in the first RAT will use the information received from the second RAT, and send a new request to the second RAT based on the available resources of the second RAT. For example, the network node in the first RAT may use the WLAN available bit rate as the new GBR value when sending a request to the second RAT.

In certain other embodiments, when the request is accepted in-part from the network node in the second RAT, the first RAT may determine that the available resources of the second RAT are not sufficient. The first RAT may then decide to abandon the potential resource aggregation with the second RAT. The network node in the first RAT can then send the second RAT a request to release the resources for those accepted bearers. The first RAT can then search for another node in the second RAT or a third RAT altogether with which to aggregate resources, or can simply determine that it will no longer seek resource aggregation.

In some embodiments, resource aggregation may be established between two network nodes within the same RAT. In such an embodiment a request will be sent from a first network node in a RAT to a second network node in the RAT. If the RAT accepts the request, the resource aggregation will begin. On the other hand, if the request is denied, the second network node may inform the first network node of its available resources. The first network node may then determine whether to attempt again to aggregate resources with the second network node, based on the indicated available resources of the second network, which were previously sent to the first network node.

Figure 2:
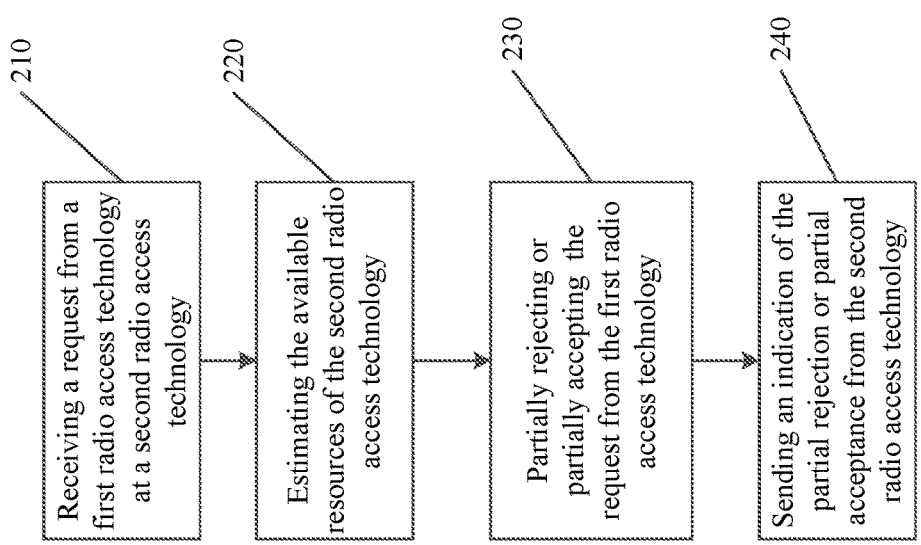
FIG. 2 illustrates a flow diagram according to certain embodiments.

FIG. 2 illustrates a flow diagram according to certain embodiments. In step 210, the second RAT receives a request from a network node in the first RAT. The message received may include at least one radio bearer indicating the radio bearer ID and a plurality of QoS parameters. For example, if the first RAT is an LTE network and the second RAT is WLAN, a WT can receive a WT Addition Request and/or a WT Modification Request Acknowledge message from the eNB. The message can include at least one E-RAB indicating the E-RAB ID and the E-RAB's QCI/ARP/GBR values.

In certain embodiments, the network node in the second RAT enforces QoS based admission control. The network node in the second RAT also determines whether to accept the request, based on the evaluation of available resources that can be used to support the requested QoS parameters. The network node may fully accept, accept in-part, reject in-part, or fully reject the request of the first RAT.

In some embodiments the network node in the second RAT can maintain a mapping between QCI/ARP to the network node. In other words, an internal mapping of specific QoS classes or queues is maintained in the second RAT, which may then be used to map the requested radio bearer by the first RAT to one of the mapped classes or queues of the second RAT. These QoS classes or queues maintained in the second RAT may be predetermined based on RAT specific agreements. In one embodiment, there may be at least four queues, where each queue corresponds to a WLAN access class. Once the message is received from the first RAT, the network node in the second RAT can map the received QoS parameters to internal second RAT specific QoS classes or queues. In some embodiments, the network node in the second RAT can then estimate for the mapped QoS class or queue the available resources that the second RAT can dedicate if and when a new radio bearer is activated, as shown in step 220. The estimate of the available resources can take into account the number of users or bearers that are currently active in the determined class or queue.

In other embodiments, the network node in the second RAT may not estimate or may forgo estimating the available resources. Therefore, the network node in the second RAT may at least partially accept or at least partially reject the request without knowing whether it can guarantee the request's requirements. In some embodiments, the network node in the second RAT does not know whether it has the available resources to guarantee the requests requirements throughout the lifetime of the request.

While the estimate in some embodiment may account for the current available resources of the second RAT, in some embodiments the estimation may be a determination of a subsequent time period in which the radio bearer will be activated. The time period may either be the next period in time, or any other time period that can be dictated by the message received from the first RAT. For example, if t represents the current time, the estimate may be of t, t+1, . . . , t+n.

In certain embodiments, the estimate can account for the specific access point in the second RAT that would serve the bearer. The estimate may also take into account the number of users that are currently being served by that access point.

In other embodiments, the second RAT estimates can assume a minimum received signal strength indication (RSSI) value for the new user equipment, such that the throughput estimation reflects a lower bound. For example, the network node will consider the amount of available resources that the second RAT can dedicate based on the signal strength of the user equipment. The better the signal strength, the less resources the second RAT may provide the requested bit rate. On the other hand, the lower the signal strength of the user equipment, the more resources the second RAT may in order to provide the requested bit rate.

Because the signal strength of the user equipment during the exact time period of the activation of the radio bearer may not be known by the second RAT, the network node can assume a minimum RSSI value for the user equipment. If the available resources that the second RAT can provide do not meet the required resourced based on the minimum RSSI, then the second RAT may accept in-part or at least in part reject the request.

In some embodiments, if the available resource estimate of the second RAT at least equals the requested QoS parameters, the network node in the second RAT can determine immediately to accept the establishment. Resource aggregation between the network node in the first RAT and the network node in the second RAT may then begin, and the network node in the second RAT may send a WT Addition Request Acknowledge and/or a WT Modification Request Acknowledge message to the first RAT. For example, in one embodiment, when the estimated available bit rate for the WLAN at least equals the requested GBR for the E-RAB, the WT can accept the request. The WT may then send an eNB an acknowledgment that resources aggregation has been activated. Once the eNB receives the acknowledgment, it may in certain embodiment activate LWA procedure towards the UE.

In yet another embodiment, if the available resources in the second RAT do not meet the requested QoS parameters, adequate QoS levels can be achieved in the second RAT by pre-empting at least one pre-emptable bearer. By pre-empting a pre-emptable bearer, the second RAT will assign at least one bearer to a lower class or queue, thereby increasing the available resources in the second RAT. Pre-empting the radio bearer can increase the available resources of the second RAT to allow the second RAT to meet the requested QoS levels.

If the amount of available resources in the second RAT is not sufficient, in certain embodiments, the network node in the second RAT may either reject, reject in-part, or accept in-part the request from the first RAT. In some embodiments, the network node in the second RAT may either reject, reject in-part, or accept in-part the request from the first RAT without estimating the available resources. As shown in step 230, the second RAT may accept in-part the request from the first RAT. The decision to accept in-part, may in some embodiments be based on the estimation of the available resources made by the network node in the second RAT. In other embodiments the second RAT may accept in-part or reject in-part without knowledge or an estimate of the available resources in the second RAT.

In certain embodiments, as in step 230, the request may be accepted in-part. Partial acceptance may mean that the network node in the second RAT indicates to the network node in the first RAT that it is accepting the request. The network node in the first RAT may have included in the request whether or not at least for one bearer it is willing to accept a partial acceptance. In a partial acceptance, the acceptance may have preconditions or terms attached to it, which are dictated by the network node in the second RAT. In other words, the network node in the second RAT may accept the request even though it may not be able to guarantee the bit rate signaled by the first RAT. The acceptance may therefore be conditional based on the first RAT agreeing to the terms dictated by the network node in the second RAT. The terms may include, for example, a lower GBR based on the estimate of the network node in the second RAT of the available bit rate. In such a partial acceptance, the network node in the second RAT sends a message indicating that the request was partially accepted or partially rejected, as shown in step 240.

If the network node in the second RAT partially accepts the request, then the network node will send an indication to the first RAT including the available resources that have been dedicated for specific bearers. In certain embodiments, if the network node in the first RAT upon receiving this indication of resources is not satisfied with the partial acceptance, it may request the network node in the second RAT to release the resources for at least some of those bearers.

In certain embodiments, the acknowledge message can contain an optional indication of the estimated available resources of the second RAT. For example, the message can indicate that estimated WLAN available bit rate, in which the WLAN available bit rate can be smaller than the GBR requested by the first RAT.

In other embodiments, the request by the first RAT may be partially rejected, rather than partially accepted. If a request is partially rejected though then the network node in the first RAT may not include any information in the request about whether or not the first RAT is willing to accept a partial acceptance by the network node in the second RAT of the QoS parameters requested for each bearer. If the network node in the first RAT then wants to establish the bearer that have been rejected in the rejection in-part, then it will have to attempt to send another request to the network node in the second RAT.

In embodiments in which partial rejection occurs, the network node in the second RAT may send the network node in the first RAT a message. The message may contain a cause value that reflects that the rejection is caused by not having sufficient resources in the second RAT for meeting the GBR request. For example, the message can indicate that estimated WLAN available bit rate, where WLAN available bit rate is smaller than GBR.

In certain embodiments, the network node in the first RAT may indicate to the network node in the second RAT whether to specify the available resources of the second RAT in the message.

When the request is partially accepted or partially rejected, and the network node in the second RAT can provide the first RAT with the available resources of the second RAT, the first RAT can then determine whether to send another request to the second RAT. This second request may be based on the indicated available resources of the second RAT. In a partial acceptance, the second request may be a message asking the network node in the second RAT to release the resources for those accepted bearers. In a partial rejection, the second request may be a new request to establish resource aggregation. In other embodiments, the network node in the first RAT may decide that is it will no longer pursue activating the aggregation procedures.

For example, where the first RAT is an LTE network and the second RAT is a WLAN, the eNB can determine how to proceed based on the WLAN available bit rate indication it receives from the WT. In one embodiment, the eNB may decide that is will not be worth to continue the LWA operation. In another embodiment, the eNB may decide to re-attempt the tunnel establishment using the WLAN available bit rate, as the new GBR value in the request message to the second RAT. Yet in other embodiments, the eNB may decide to ask the WT to release the resources for at least one of the bearers it has accepted in the partial acceptance of the request.

In certain embodiments, the available resource information of the second RAT may be provided in a separate message from the acknowledgment message sent by the second RAT to the first RAT. For example, the network node in the second RAT may send the first RAT an acknowledgement message that the request has not been accepted, or that the request has been partially accepted. This acknowledgement message, however, can be devoid of any specific information pertaining to the resource availability of the second RAT.

In some other embodiments, the network node in the first RAT may send a separate request to the network node in the second RAT requesting a status report. The second RAT may send the status report to the first RAT, including an indication of the available resources of the second RAT.

In some embodiments, when the network node in the first RAT is aware of the mapping of the QoS parameters in the second RAT, the network node may request at least one specific class or queues at the same time. For example, when the eNB is aware of the mapping of QCI or ARP to internal WLAN classes or queues, the eNB may request for one or more specific classes or queues at the same time. This request may be included in the initial request message sent from the network node in the first RAT to the network node in the second RAT. In other embodiments, the request from the first RAT has to include at least QCI or ARP parameters.

Figure 3:
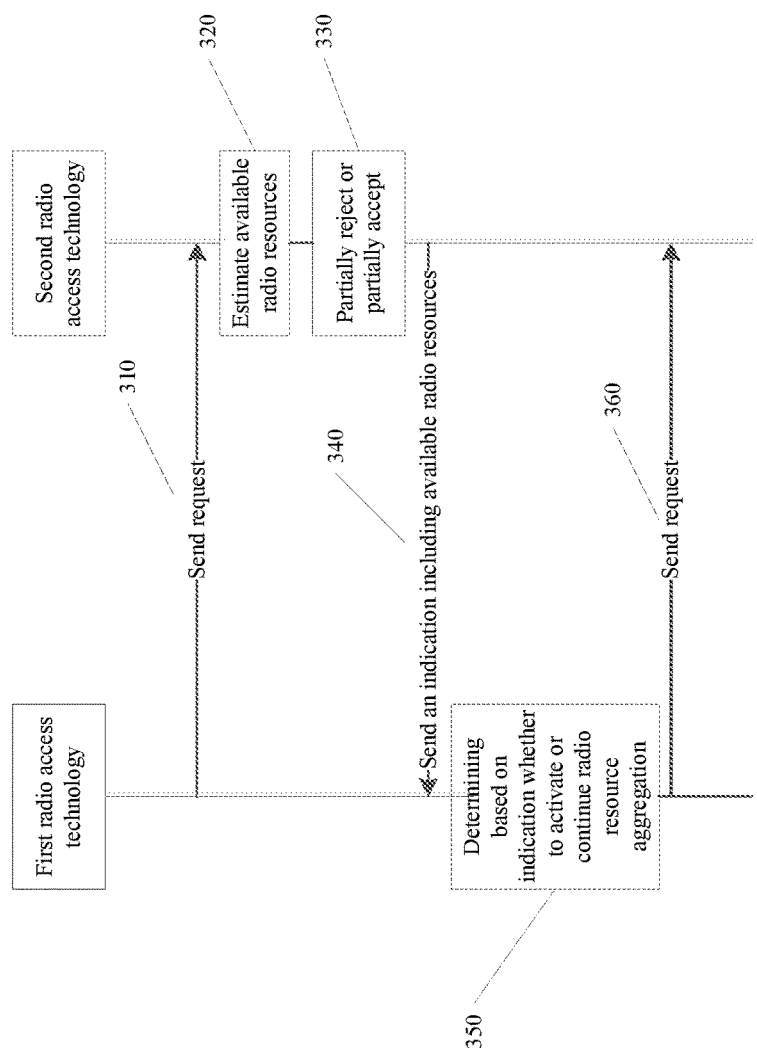
FIG. 3 illustrates a signal flow diagram according to certain embodiments.

FIG. 3 illustrates a flow diagram according to certain embodiments. In step 310, a network node in a first RAT sends a request to a network node in a second RAT. The request may include a plurality of QoS parameters or a bearer ID. The network node in the second RAT will then determine whether to partially accept the request. In making this determination, the network node may compare its estimated available resources, if available, to the QoS parameters it received from the first RAT. In some embodiments, the determination may be made without the network node having knowledge of or an estimate of its available radio resources.

In step 330, the network node in the second RAT can determine to accept in-part the request. In other embodiments, the network node in the second RAT may choose to fully accept, fully reject, or partially reject the request. If the request is accepted, then aggregation of the resources of the network node in the first RAT and the network node in the second RAT begins. If the request is partially accepted, the network node in the second RAT can then send an indication or an acknowledgement to the first RAT that the request has been accepted in-part, as in step 340. In some embodiments, the indication may include an indication of the available radio resources of the second RAT.

Based on this indication or acknowledgment, in step 350, the network node in the first RAT can then determine whether it is willing to accept this proposal by the network node in the second RAT in which the request was only partially accepted. If the network node in the first RAT is not satisfied with the partial acceptance, it may ask the network node in the second RAT to release the resources for at least some of the accepted bearers. As shown in step 360, the network node in the first RAT can send to the request to release the resources that were provided by the second RAT in the partial acceptance.

In other embodiments, the network node in the first RAT may decide to send a request to a different or another network node in the second RAT. Alternatively, the network node in the first RAT may also decide to send a request to a third RAT.

In some other embodiments, instead of a network node in a first RAT sending a request to a network node in a second RAT, as shown in step 310, the request can be sent from a first node in a RAT to a second node in the RAT. In other words, the request can remain within the same RAT. The second network node in the RAT will then estimate its available radio resources, in step 320, and based on the estimation it may determine whether or not to accept in part the request. If accepted in-part, the second network node can send an indication to the first network node.

Figure 4:
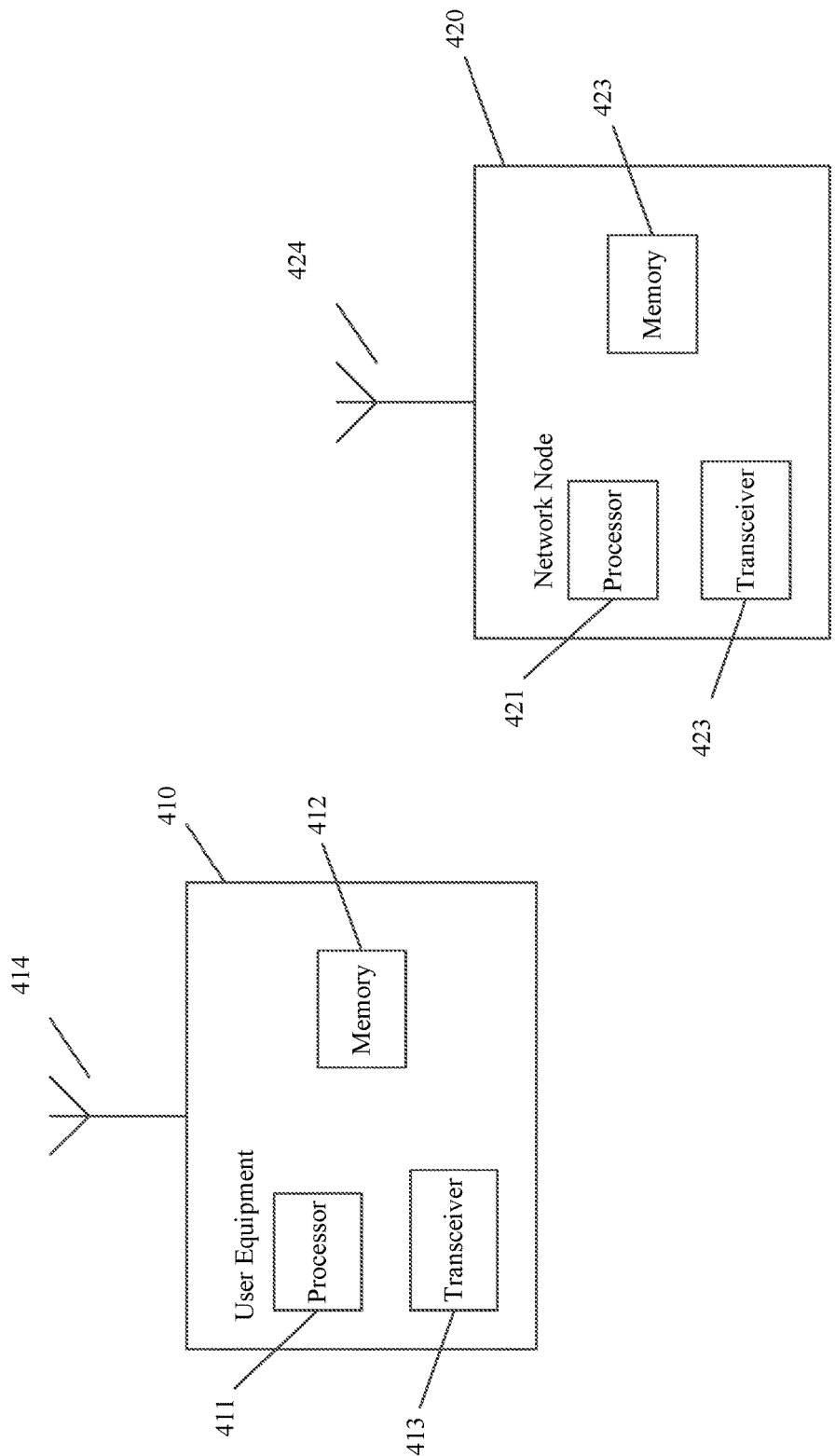
FIG. 4 illustrates a system according to certain embodiments.

FIG. 4 illustrates a system according to certain embodiments. It should be understood that each block of the flowchart of FIGS. 1, 2, and 3, and any combination thereof, may be implemented by various means or their combinations, such as hardware, software, firmware, one or more processors and/or circuitry. In one embodiment, a system may include several devices, such as, for example, network node 420 and UE or user device 410. The system may include more than one UE 410 and more than one network node 420, although only one of each is shown for the purposes of illustration. A network node can be an access point, a base station, a NB, an eNB, a 5G NB, server, host or any of the other network nodes discussed herein.

Each of these devices may include at least one processor or control unit or module, respectively indicated as 421 and 411. At least one memory may be provided in each device, and indicated as 422 and 412, respectively. The memory may include computer program instructions or computer code contained therein. One or more transceiver 423 and 413 may be provided, and each device may also include an antenna, respectively illustrated as 424 and 414. Although only one antenna each is shown, many antennas and multiple antenna elements may be provided to each of the devices. Other configurations of these devices, for example, may be provided. For example, network node 420 and UE 410 may be additionally configured for wired communication, in addition to wireless communication, and in such a case antennas 424 and 414 may illustrate any form of communication hardware, without being limited to merely an antenna.

Transceivers 423 and 413 may each, independently, be a transmitter, a receiver, or both a transmitter and a receiver, or a unit or device that may be configured both for transmission and reception. The transmitter and/or receiver (as far as radio parts are concerned) may also be implemented as a remote radio head which is not located in the device itself, but in a mast, for example. The operations and functionalities may be performed in different entities, such as nodes, hosts or servers, in a flexible manner. In other words, division of labor may vary case by case. One possible use is to make a network node deliver local content. One or more functionalities may also be implemented as virtual application(s) in software that can run on a server.

A user device or user equipment 410 may be a mobile station (MS) such as a mobile phone or smart phone or multimedia device, a computer, such as a tablet, provided with wireless communication capabilities, personal data or digital assistant (PDA) provided with wireless communication capabilities, portable media player, digital camera, pocket video camera, navigation unit provided with wireless communication capabilities or any combinations thereof.

In some embodiment, an apparatus, such as a node or user device, may include means for carrying out embodiments described above in relation to FIGS. 1, 2, and 3. In certain embodiments, at least one memory including computer program code can be configured to, with the at least one processor, cause the apparatus at least to perform any of the processes described herein.

According to certain embodiments, an apparatus may include at least one memory including computer program code, and at least one processor. The at least one memory and the computer program code are configured, with the at least one processor, to cause the apparatus at least to receive a request from a first RAT at a network node in a second RAT, and partially accept or partially reject the request. The at least one memory and the computer program code are configured, with the at least one processor, to cause the apparatus at least to send an indication of the partial rejection or partial acceptance to the first RAT, where the indication is used in determining whether to activate or continue radio access aggregation.

According to certain embodiments, an apparatus may include means for receiving a request from a first RAT at a network node in a second RAT, and means for partially accepting or partially rejecting the request. The apparatus also includes means for sending an indication of the partial acceptance or partial rejection, where the indication is used in determining whether to activate or continue radio access aggregation.

According to certain embodiments, an apparatus may include at least one memory including computer program code, and at least one processor. The at least one memory and the computer program code are configured, with the at least one processor, to cause the apparatus at least to sending a request from a first RAT to a network node in a second RAT, and receiving an indication when the request is partially accepted or partially rejected. The at least one memory and the computer program code are configured, with the at least one processor, to cause the apparatus at least to determine whether to activate or continue radio access aggregation based on the indication.

According to certain embodiments, an apparatus may include means for sending a request from a first RAT to a network node in a second RAT, and means for receiving an indication of when the request is partially accepted or partially rejected. The apparatus also includes means for determining whether to activate or continue radio access aggregation based on the indication.

Processors 411 and 421 may be embodied by any computational or data processing device, such as a central processing unit (CPU), digital signal processor (DSP), application specific integrated circuit (ASIC), programmable logic devices (PLDs), field programmable gate arrays (FPGAs), digitally enhanced circuits, or comparable device or a combination thereof. The processors may be implemented as a single controller, or a plurality of controllers or processors.

For firmware or software, the implementation may include modules or unit of at least one chip set (for example, procedures, functions, and so on). Memories 412 and 422 may independently be any suitable storage device, such as a non-transitory computer-readable medium. A hard disk drive (HDD), random access memory (RAM), flash memory, or other suitable memory may be used. The memories may be combined on a single integrated circuit as the processor, or may be separate therefrom. Furthermore, the computer program instructions may be stored in the memory and which may be processed by the processors can be any suitable form of computer program code, for example, a compiled or interpreted computer program written in any suitable programming language. The memory or data storage entity is typically internal but may also be external or a combination thereof, such as in the case when additional memory capacity is obtained from a service provider. The memory may be fixed or removable.

The memory and the computer program instructions may be configured, with the processor for the particular device, to cause a hardware apparatus such as network node 420 and/or UE 410, to perform any of the processes described above (see, for example, FIGS. 1, 2, and 3). Therefore, in certain embodiments, a non-transitory computer-readable medium may be encoded with computer instructions or one or more computer program (such as added or updated software routine, applet or macro) that, when executed in hardware, may perform a process such as one of the processes described herein. Computer programs may be coded by a programming language, which may be a high-level programming language, such as objective-C, C, C++, C#, Java, etc., or a low-level programming language, such as a machine language, or assembler. Alternatively, certain embodiments may be performed entirely in hardware.

Furthermore, although FIG. 4 illustrates a system including a network node 420 and a UE 410, certain embodiments may be applicable to other configurations, and configurations involving additional elements, as illustrated and discussed herein. For example, multiple user equipment devices and multiple network nodes may be present, or other nodes providing similar functionality, such as nodes that combine the functionality of a user equipment and an access point, such as a relay node. The UE 410 may likewise be provided with a variety of configurations for communication other than communication network node 420. For example, the UE 410 may be configured for device-to-device communication.

The embodiments described above can help to improve the experiences of a user equipment within a communication system. The embodiments allow for a communication system where one RAT possesses knowledge about the available resources of a second RAT. Because the resource availability of the second RAT is a highly fluctuating value, which can depend on dynamic radio signal or interference, as well as load conditions, it can be beneficial for a first RAT to have knowledge of the available resources of the second RAT. In addition, because the resource availability of the second RAT fluctuates, the indication of the available resources of the second RAT should be valid at the time the primary cell tries to establish the user plane tunnel.

The first RAT can then use this knowledge to determine whether resource aggregation between the first RAT and the second RAT will be beneficial. If aggregation would not be beneficial, the first RAT can determine not to pursue aggregation with a network node in a second RAT, and conserve resources used for signaling and activation of the aggregation.

In an embodiment, in which the first RAT may be an LTE network and the second RAT may be a WLAN, it is beneficial for the eNB in the LTE to evaluate whether LWA is beneficial and should be activated in the first place. This can allow the eNB to enforce a minimum target when activating LWA, avoiding the activation of the LWA when WLAN cannot contribute sufficiently to the user interface.

The features, structures, or characteristics of certain embodiments described throughout this specification may be combined in any suitable manner in one or more embodiments. For example, the usage of the phrases "certain embodiments," "some embodiments," "other embodiments," or other similar language, throughout this specification refers to the fact that a particular feature, structure, or characteristic described in connection with the embodiment may be included in at least one embodiment of the present invention. Thus, appearance of the phrases "in certain embodiments," "in some embodiments," "in other embodiments," or other similar language, throughout this specification does not necessarily refer to the same group of embodiments, and the described features, structures, or characteristics may be combined in any suitable manner in one or more embodiments.

One having ordinary skill in the art will readily understand that the invention as discussed above may be practiced with steps in a different order, and/or with hardware elements in configurations which are different than those which are disclosed. Therefore, although the invention has been described based upon these preferred embodiments, it would be apparent to those of skill in the art that certain modifications, variations, and alternative constructions would be apparent, while remaining within the spirit and scope of the invention. For example, one variation may be a partial rejection, full acceptance, or full rejection scenario.

Partial Glossary

DC Dual Connectivity
EPS Evolved packet system
ID Identifier
LWA LTE WLAN aggregation
QoS Quality of Service
RAT Radio Access Technology
RSSI Received Signal Strength Indication
WLAN Wireless local access network
WT WLAN termination
Xw LWA interface

We claim:

1. An apparatus comprising:
at least one memory comprising computer program code;
at least one processor;

wherein the at least one memory and the computer program code are configured, with the at least one processor, to cause the apparatus at least to:

receive a request from a first radio access technology at a network node in a second radio access technology, wherein the request relates to available resources at the second radio access technology to be used in radio access aggregation with the first radio access technology;

at least partially reject or at least partially accept the request from the first radio access technology; and send from the network node in the second radio access technology to another network node in the first radio access technology an indication of the at least partial rejection or the at least partial acceptance.

2. The apparatus according to claim 1, wherein the at least partial rejection or the at least partial acceptance is based on available resources of the second radio access technology.

3. The apparatus according to claim 2, wherein the at least one memory and the computer program code are also configured, with the at least one processor, to cause the apparatus at least to:

estimate available resources of the network node in the second radio access technology.

4. The apparatus according to claim 3, wherein the estimating of available resources comprises at least one of a bit rate or a packet delay.

5. The apparatus according to claim 1, wherein the network node in the second radio access technology may at least partially reject or at least partially accept the request without knowing available resources of the second radio access technology or without knowing whether the second radio access technology can guarantee the available resources required by the request.

6. The apparatus according to claim 1, wherein the request comprises another indication of whether or not the another network node in the first radio access technology will accept the at least partial acceptance by the network node in the second radio access technology.

7. The apparatus according to claim 1, wherein the at least partial rejection or at least partial acceptance comprises a precondition determined by the network node in the second radio access technology.

8. The apparatus according to claim 7, wherein the request comprises a first guaranteed bit rate requested from a first radio access technology, and wherein the precondition comprises a second guaranteed bit rate lower than the requested first guaranteed bit rate.

9. The apparatus according to claim 1, wherein the second radio access technology is a wireless local area network.

10. The apparatus according to claim 1, wherein the first radio access technology is a long term evolution network.

11. The apparatus according to claim 1, wherein the request comprises at least one of allocation and retention priority, guaranteed bit rate, or quality of service class identifier.

12. An apparatus comprising:
at least one memory comprising computer program code;
at least one processor;
wherein the at least one memory and the computer program code are configured, with the at least one processor, to cause the apparatus at least to:
send a request from a first access technology to a network node in a second radio access technology;
receive an indication at another network node of the first access technology that the request is at least partially rejected or at least partially accepted; and determine at the another network node of the first access technology whether to activate or continue a radio access aggregation with the second access technology based on the indication.

13. The apparatus according to claim 12, wherein the indication comprises available radio resources of the second radio access technology.

14. The apparatus according to claim 13, wherein the indication of available radio resources is indicated per quality of service class or per user equipment.

15. The apparatus according to claim 12, wherein the at least partial rejection or the at least partial acceptance comprises a precondition determined by the network node in the second radio access technology.

16. The apparatus according to claim 12, wherein the request comprises a first guaranteed bit rate, and wherein the precondition comprises a second guaranteed bit rate lower than the requested first guaranteed bit rate.

17. The apparatus according to claim 12, wherein the at least one memory and the computer program code are configured, with the at least one processor, to further cause the apparatus to at least one of:
determine based on the indication to re-attempt or not re-attempt to establish the radio resource aggregation between the first radio access technology and the second radio access technology;
determine based on the indication to attempt to establish the radio resource aggregation between the first radio access technology and an additional node in the second radio access technology; and
determine based on the re-attempt to establish the radio resource aggregation between the first radio access technology and a third radio access technology.

18. The apparatus according to claim 12, wherein the at least one memory and the computer program code are also configured, with the at least one processor, to further cause the apparatus to at least one of:
send, based on the indication, another request to the network node in the second radio access technology requesting release of the resources made available by the second radio access technology as part of the at least partial acceptance; and
send the another request from the first radio access network to the second radio access network based on the available resources.

19. The method according to claim 12, wherein the request comprises at least one of allocation and retention priority, guaranteed bit rate, quality of service class identifier, or packet delay budget.

20. An apparatus comprising:
at least one memory comprising computer program code;
at least one processor;
wherein the at least one memory and the computer program code are configured, with the at least one processor, to cause the apparatus at least to:
receive a request from a first node in a radio access technology at a second node in the radio access technology, wherein the request relates to available resources at the second node to be used in radio access aggregation with the first node;
at least partially reject or at least partially accept the request from the first node; and
send an indication of the at least partial rejection or the at least partial acceptance from the second node to the first node.

* * * * *